Dec. 28, 1926.
G. A. GREEN
BRAKE MECHANISM
Filed March 16, 1922 4 Sheets-Sheet 1
1,612,432
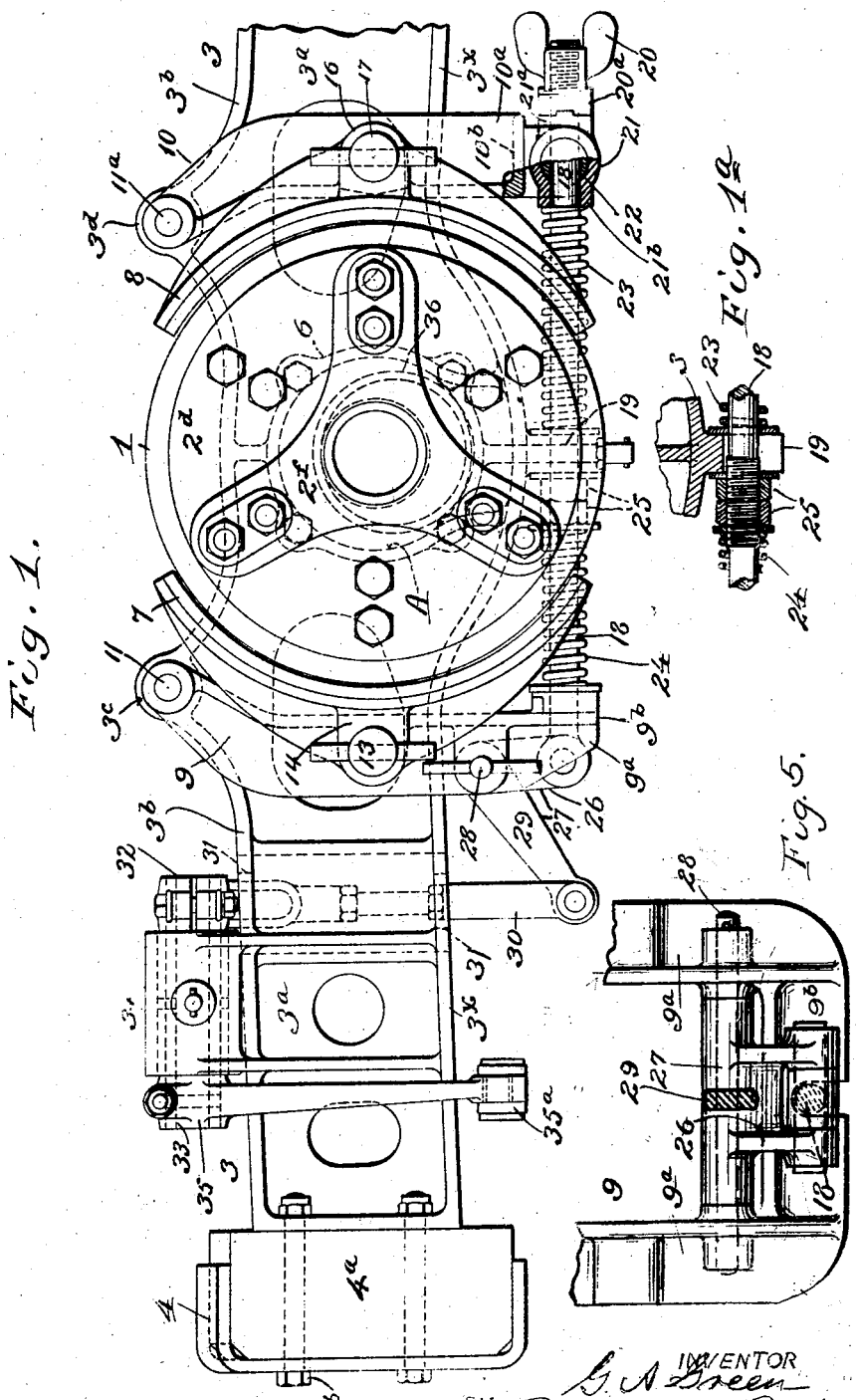

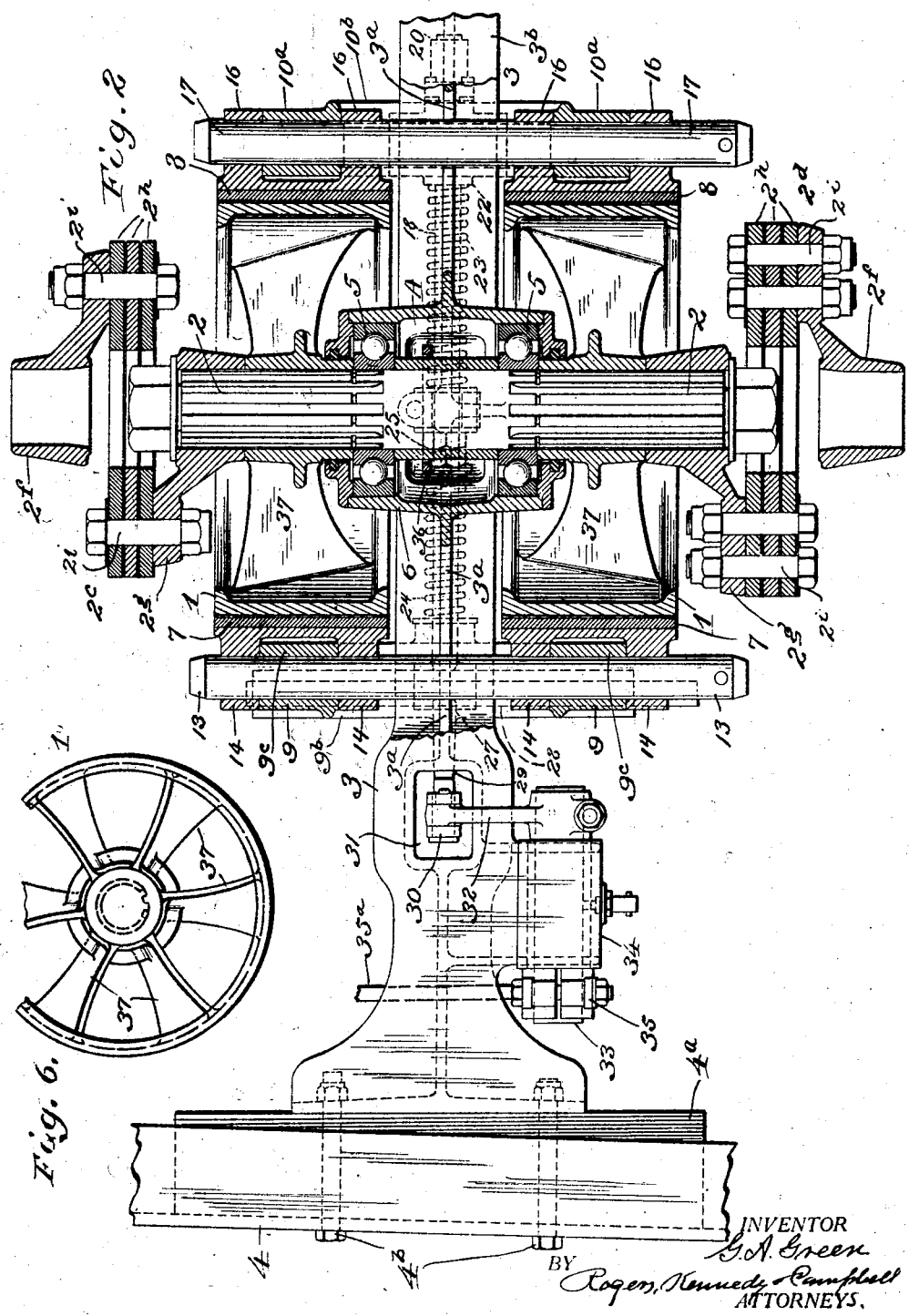

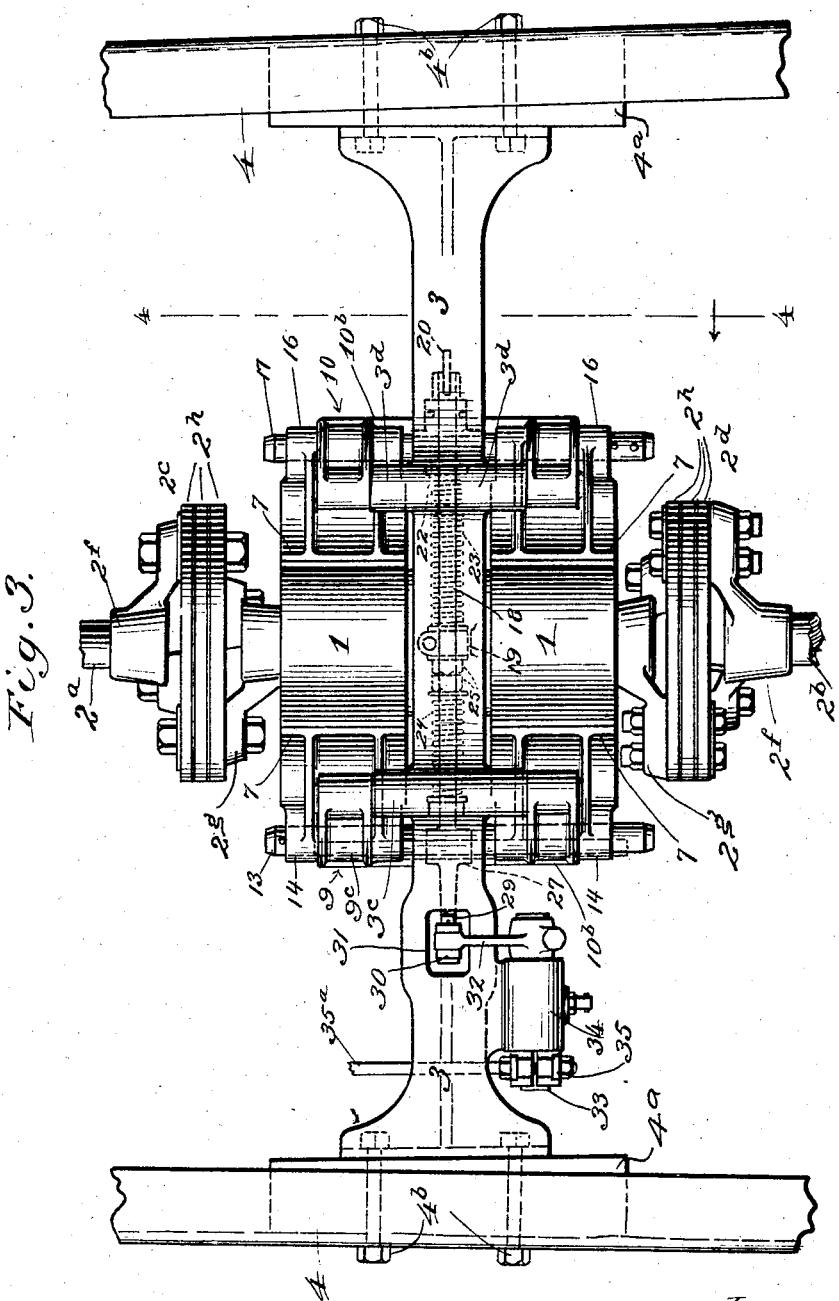

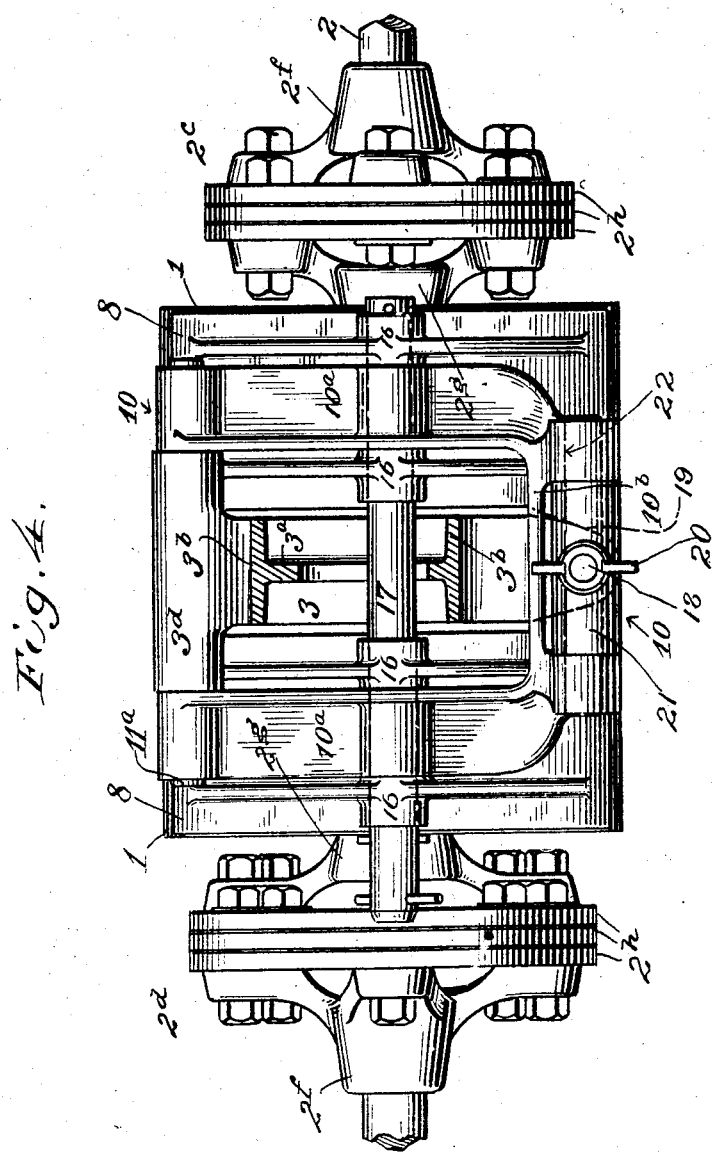

Patented Dec. 28, 1926.

1,612,432

UNITED STATES PATENT OFFICE.

GEORGE A. GREEN, OF CHICAGO, ILLINOIS.

BRAKE MECHANISM.

Application filed March 16, 1922. Serial No. 544,132.

This invention relates to a brake mechanism designed more particularly for motor vehicles, and has reference more especially to the type of brake mechanism in which the braking action is applied to the propeller shaft; and the invention consists in an improved arrangement and construction of the parts wherein the maximum area of brake drum surface will be provided on the shaft, and the brake shoes will be so supported and operated that the braking pressure will be applied evenly and uniformly without injurious stresses on the shaft; wherein the brake drums and operating parts may be removed or applied as a unit without disturbing the propeller shaft; wherein the brake drums will not be affected by any misalignment or deflection of the propeller shaft; and wherein the parts may be adjusted and controlled so as to maintain a condition of maximum efficiency in the operation of the mechanism.

The improved arrangement and construction of the parts will be fully described in the specification to follow and the novel features thereof will be set forth in the appended claims.

In the accompanying drawings:

Fig. 1 is a side elevation of my improved brake mechanism with the chassis frame on one side omitted.

Fig. 1ª is a fragmentary sectional view of a detail.

Fig. 2 is a horizontal transverse sectional plan view of the same.

Fig. 3 is a top plan view, on a slightly reduced scale, showing the support afforded at both sides by the chassis frame.

Fig. 4 is a transverse sectional elevation on the line 4—4 of Fig. 3 looking to the left in Fig. 3.

Fig. 5 is a fragmentary view in elevation of one of the brake shoe operating yokes.

Fig. 6 is an elevation of one of the brake drums removed.

Referring to the drawings:

My improved brake mechanism comprises two brake drums 1, 1 which are fixedly mounted side by side in spaced relations on a propeller shaft 2 of a motor vehicle, in the present instance at a point between the transmission mechanism and the differential gear mechanism. The two drums are situated respectively on opposite sides of a transverse frame member 3 fixed at its ends to the fore and aft side frame bars 4 of the chassis frame, and the propeller shaft is given rotary bearing support in the transverse frame member by means of two radial ball bearings 5, 5 consisting each of an outer race ring and an inner race ring and interposed bearing balls, the outer rings being fixed within a circular hollow shell 6 on the transverse frame member and extending in opposite directions axially thereof, and the inner race rings being fixed to the propeller shaft. The portion of the propeller shaft on which the two brake drums are mounted is a comparatively short section of the shaft and is connected with the main portions $2^a$ and $2^b$ of the shaft respectively by two flexible couplings, a coupling $2^c$ connecting one end of the shaft section with the portion $2^a$ of the propeller shaft, and a coupling $2^d$ connecting the opposite end of the section with the portion $2^b$ of the propeller shaft. These couplings are of a form which will enable the shaft section 2 to be readily disconnected from the other portions of the propeller shaft, and in the present instance each coupling comprises two spiders $2^f$ and $2^g$ fixed respectively to the adjacent ends of the propeller shaft sections, an intermediate flexible disc $2^h$, and removable fastening bolts $2^i$ passing through the spiders and disc. As a result of this connection, the section 2 of the propeller shaft on which the brake drums are mounted, is isolated from the main portions of the shaft and is not affected by any deflections or misalignment of the shaft.

The said transverse frame member consists in the present instance of a vertical web portion $3^a$ formed on its upper and lower edges with horizontal flanges $3^b$ and $3^b$. The upper flange is provided with transverse horizontal bosses $3^c$ and $3^d$ located at opposite sides of the propeller shaft, and the lower flange is continuous from one end of the frame member to the other and curved downwardly at its central portion below the shaft as best shown in Fig. 1. The hollow shell 6 projects outwardly from the circular portion of the web and forms an annular chamber A surrounding the shaft between the two ball bearings, the purpose of which will presently appear.

Two brake applying members in the form of shoes 7, 7 are arranged at one side of the brake drums to act on the drums at that side, and two similar members in the form of brake shoes 8, 8 are arranged at the opposite side of the drums to act at that side, thus providing two pairs of brake shoes, one pair on each side of the brake drums.

The brake shoes of each pair are pivotally supported independently of each other midway between their ends by a brake shoe operating member in the form of a yoke 9 for the brake shoes 7, 7 and a yoke 10 for the brake shoes 8, 8. These yokes are pivoted at their upper ends to the transverse frame member 3 respectively on opposite sides of the brake drums, and they are connected together at their lower ends by suitable means for simultaneous movement to and from each other in applying and releasing the braking pressure, as will be more fully described hereinafter.

The yoke 9 is of general U form, comprising two vertical parallel side limbs $9^a$ and a lower horizontal end limb $9^b$. The upper ends of the side limbs are formed with aligned holes which loosely surround the ends of a horizontal pivot pin 11 supported by and projecting from the horizontal boss $3^c$ on the transverse frame member, whereby the yoke is pivotally suspended at its upper end from the frame member so that it may swing back and forth to operate the brake shoes. A horizontal pivot stud 13 extends through the two side limbs of the yoke, and the two brake shoes 7 are pivotally connected with this pin side by side by means of two pairs of lugs 14, 14, one pair on each brake shoe projecting outwardly from the shoe about midway of its length. The lugs of a pair are formed with aligned holes loosely surrounding the pin, with the lugs of one pair extending on opposite sides of one of the side limbs of the yoke, and with the lugs of the other pair extending on opposite sides of the other limb of the yoke as best shown in Fig. 2.

The yoke 10 is similarly formed with two parallel side limbs $10^a$ and a lower horizontal end limb $10^b$, and the yoke is pivotally suspended at its upper end from a horizontal pivot pin $11^a$ sustained by the boss $3^d$ on the transverse frame member. The brake shoes 8, 8 are pivotally connected with the yoke by means of two pairs of lugs 16, 16 projecting outwardly from the rear sides of the brake shoes, and these lugs loosely surround a pivot stud 17 extending through the side limbs of the yoke, with the lugs of the two pairs bearing respectively on opposite sides of said side limbs.

The connection of the lower ends of the yokes to cause them to move in unison as above mentioned, is in the present instance effected by means of a horizontal transverse connecting rod 18, see Fig. 1, which rod extends at its middle portion loosely through a fixed lug 19 depending from the center of the transverse frame member. The lower end limb $10^b$ of the yoke 10 is recessed at its center to receive a sleeve 21 which is mounted loosely on a pin 22 supported at its ends in the end portions of the limb, which sleeve is formed on its opposite sides with bosses $21^a$ and $21^b$. Aligning holes are formed in the sleeve bosses and pin, and through these holes, the right hand end of the rod 18 as shown in Fig. 1 extends loosely, and is threaded on its outer end to receive a thumb nut 20 which bears against a collar $20^a$ loosely surrounding the rod and bearing in turn against the outer boss $21^a$ with which it is interlocked to prevent the collar from turning. A spiral spring 23 surrounds the rod 18 and bears at its outer end against the boss $21^b$ and at its inner end against the fixed lug 19. At its opposite end the rod extends loosely through the lower end limb of the yoke 9, and a spiral spring 24 encircles the rod and bears at its outer end against the inner side of the limb, and at its inner end against an adjustable stop in the form of a two-part nut 25 screwed on the rod and adapted to abut against the fixed lug 19. The end of the rod at the outer side of the yoke 9 is pivoted to the lower end of one arm 26 of an operating elbow lever 27, which elbow lever is mounted to rock on a horizontal transverse pin 28 supported by the side limbs of the yoke. The other arm 29 of the elbow lever has pivoted to it on an axis parallel with that of the elbow lever, the lower end of a link 30 which extends upwardly through a vertical opening 31 in the transverse frame member, to the upper side of the same. This opening is formed midway between the front and rear of the member, at which point the web $3^a$ is offset and extends in opposite directions around the opening as shown in Fig. 2 so as to preserve the continuity of the web and the strength of the member. At its upper end the link is forked to embrace the free end of an arm 32 to which it is pivoted on an axis extending at right angles to the pivotal axis of the lower end of the link. The arm 32 is fixed at its opposite end to one end of a rock shaft 33 mounted in bearings 34 on a bracket $34^a$ projecting rearwardly from the side of the frame member $3^a$. The opposite end of the rock shaft has fixed to it an operating arm 35 which extends downwardly and is adapted to have connected with it a rod $35^a$ or other connection which may be extended within reach of the operator. The manner of connecting the link 30 at its ends respectively to the arm 29 of the elbow lever and to the arm 32 on the rock shaft 33, and the relation of the two pivotal axes of these connections is such that the link 30 will be confined to movement in an endwise direction except as to the natural inherent resiliency of the parts which when subjected to strain might allow of a slight movement in directions other than endwise. This characteristic of the connection of the link brings about a functional operation of the parts in applying the braking pressure as will be presently described.

Due to the mounting of the brake drums on the short section 2 of the propeller shaft, and due to the support of the section 2 and the brake shoes and operating yokes by the transverse frame member as above described, the entire brake mechanism may be removed as a unit with the transverse frame member for inspection or repairs, by first disconnecting the flexible couplings and the operating rod 35ª, and then disconnecting the transverse member from the side bars 4 of the chassis frame. On reference to Figs. 1 and 3 it will be seen that the bars 4 of the chassis frame converge slightly toward the front and are in the form of channel bars with the channels facing inwardly. To afford a bearing support by the channel bars for the parallel ends of the transverse member, wedge shaped filler blocks 4ª—4ª are seated in the channels, and the ends of the transverse member are seated against the inner faces of the blocks, and the parts firmly but detachably connected together by means of connecting bolts 4ᵇ—4ᵇ extending through end flanges on the transverse member and through the blocks and vertical web portions of the frame members 4. As a result of this method of connecting the transverse member to the chassis frame, the former, together with the connected brake mechanism, may be removed as a unit after first removing the fastening bolts, by lifting the parts vertically; and they may in a similar manner be set in place between the chassis frame bars.

The operation of the parts is as follows:
Normally the brake shoe operating yokes and connected parts are in the positions shown in Fig. 1, with the brake shoes out of contact with the brake drums, and with the nut 25 abutting against fixed lug 19. In applying the braking pressure, the operating arm 35 is shifted to pull link 30 upwardly, which action, due to the fact that the link is restrained against movement in other directions, will act with a toggle effect on the yoke 9 through the medium of the arm 29 of the elbow lever, and will force the yoke 9 towards the drums. At the same time the rocking action of the elbow lever relative to the yoke will pull rod 18 to the left, Fig. 1, and will shift nut 25 out of engagement with fixed lug 19, and by this action yoke 10 will be drawn in towards the brake drums. The movement of the yokes in this manner towards each other effects a corresponding movement of the connected brake shoes and forces them into engagement with the opposite sides of the brake drums and thereby applies a balanced braking pressure. In this action of the parts, the springs 23 and 24 will be compressed respectively between the inner sides of the yokes and the opposite sides respectively of the fixed lug 19 and the nut 25, and on the release of the operating connections by the operator, the springs in expanding will move the yokes outwardly and away from each other and will consequently similarly move the connected brake shoes and thereby disengage them from the brake drums, and will again seat nut 25 against fixed lugs 19.

By forming the yokes each with the two side limbs pivotally supporting the brake shoes, the shoes are given some degree of independent resilient support, due to the inherent elasticity or spring possessed by the limbs independently of each other. Consequently the yokes will act on the brake shoes with a certain amount of flexibility, and will cause the shoes to exert a balanced and even pressure on the drums.

The purpose of the thumb nut 20 and nut 25 is to effect the adjustments of the brake shoes relative to the drums so that the proper spacing of the brake shoes from the drums may be effected and made equal at both sides. If for instance the brake shoes 7 are spaced a greater distance from the drums than are the brake shoes 8, the nut 25 is screwed to the left (Fig. 1) on the rod 18, and the rod will be shifted to the right by the action of spring 24 in again seating the nut against lug 19, and in this action yoke 9 will be moved to the right and will thereby carry brake shoes 7 closer to the drums. The movement of the rod 18 to the right will at the same time carry yoke 10 and the connected brake shoes 8 to the right and will widen the space between the shoes and drums. In this way the decrease of the greater spacing at one side and the increase of the lesser spacing on the other side will reach a neutral point where the spacing on both sides will be equal. Or on the other hand if the spacing of shoes 7 is less than that of shoes 8, nut 25 is screwed to the right on the rod to increase the spacing of shoes 7 and decrease that of shoes 8. The thumb nut 20 affords a means for adjusting the spacing of shoes 8 independently of that of shoes 7, for with the latter at a given definite position, as determined by the position of nut 25 on the rod as it abuts against lug 19, the brake shoes 8 can be adjusted to or from the drums by screwing up or unscrewing nut 20, which action will not affect the position of the rod and consequently that of the brake shoes 7. By the employment of this mechanism therefore, the spacing of the two sets of brake shoes from the drums may be accurately adjusted and caused under all conditions to be equal at the opposite sides of the drums, so as to apply a balanced braking pressure thereto.

The annular chamber A before alluded to within the hollow shell 6, serves as a lubricant receptacle for the bearings, and a gravitating floating member in the form of a ring 36 surrounds the shaft within the chamber and acts in the rotation of the shaft to effectively distribute the lubricant to the bearings.

The brake drums are formed on their interior with radial wings or vanes 37 which act, in the rotation of the drums, to circulate the air through them and thereby prevent the bearings from becoming overheated, and the lubricant from being burned out.

In the foregoing description and accompanying drawings I have set forth my invention in the particular form and detailed construction which I prefer to adopt, but it will be manifest that these details may be variously changed and modified without departing from the spirit of the invention; and further it will be understood that the invention is not limited to any particular form or construction of the parts except in so far as such limitations are specified in the claims.

Having thus described my invention, what I claim is:

1. In a brake mechanism, the combination of a fixed supporting member provided with a hollow open ended shell, a rotatable shaft extending through said shell and spaced therefrom to form a lubricant holding chamber surrounding the shaft, bearings between the shell and shaft at opposite ends of the chamber, a brake drum fixed to the shaft, brake shoes movably sustained by the supporting member, and means for operating the brake shoes to act on the brake drum.

2. In a brake mechanism, the combination of a fixed supporting member provided with a hollow shell, a rotatable shaft extending through the shell and spaced therefrom to form a lubricant holding chamber surrounding the shaft, bearings between the shell and shaft at opposite ends of the chamber, a lubricant distributing member within the chamber sustained by the shaft, a brake drum fixed to the shaft, brake shoes movably sustained by the supporting member, and means for operating the brake shoes to act on the drum.

3. In combination with a vehicle frame, a transverse frame member sustained thereby and adapted to support a brake mechanism having a brake drum shaft, brake shoe operating members, and an operating link, said transverse frame member being formed with a horizontal transverse hollow boss to afford a bearing for the shaft, and being formed with two transverse bosses above said hollow boss to support the brake shoe operating members, and being formed further with a vertical opening extending through it to receive the operating link.

4. In a brake mechanism, the combination of a fixed supporting member, a rotary brake drum, brake shoe operating members pivotally mounted on said supporting member at opposite sides of the brake drum, brake shoes carried by the respective operating members, a rod engaged with one of the operating members and extending loosely through the other, an abutment on the supporting member, a nut screwed on the rod and engaging the abutment at one side of the latter, an expansion spring on the rod between the nut and the operating member at that side, a second expansion spring on the rod engaging the other side of the abutment and the operating member at that side, and means for operating the rod to apply and release the brakes.

5. In a brake mechanism, the combination of a fixed supporting member, a rotary brake drum, brake shoe operating members pivotally mounted on said supporting member at opposite sides of the brake drum, brake shoes carried by the respective operating members, a rod adjustably engaged with one of the operating members and extending loosely through the other, an abutment on the supporting member, a nut screwed on the rod and engaging the abutment at one side of the latter, an expansion spring on the rod between the nut and the operating member at that side, a second expansion spring on the rod engaging the other side of the abutment and the operating member at that side, and means for operating the rod to apply and release the brakes.

6. In a brake mechanism, the combination of a fixed supporting member provided with an abutment, a rotary brake drum, brake shoe operating members pivotally mounted on the supporting member at opposite sides of the brake drum, brake shoes carried by the respective operating members, a rod adjustably engaged with one of the operating members and extending loosely through the abutment and through the other operating member, an elbow lever pivoted to the last mentioned operating member and having one of its arms pivoted to the rod, a nut screwed on the rod and engaging the abutment at one side of the latter, an expansion spring on the rod between the nut and the operating member at that side, a second expansion spring on the rod engaging the other side of the abutment and the operating member at that side, and means for rocking the elbow lever to operate the brakes.

In testimony whereof, I have affixed my signature hereto.

GEORGE A. GREEN.